United States Patent
Izawa et al.

[11] Patent Number: 5,459,822
[45] Date of Patent: Oct. 17, 1995

[54] SORTING PROCESSOR

[75] Inventors: Yasuhiro Izawa, Suita; Tatsuya Fujii, Nishinomiya; Naoto Shiraishi, Toyonaka; Masanobu Fukushima, Toyonaka; Tatsuya Nakajima, Toyonaka, all of Japan

[73] Assignee: Ricoh Company, Ltd., Tokyo, Japan

[21] Appl. No.: 127,744

[22] Filed: Sep. 27, 1993

[30] Foreign Application Priority Data

Sep. 29, 1992 [JP] Japan .................. 4-285470

[51] Int. Cl.⁶ .......................................... G06F 15/72
[52] U.S. Cl. .......................................... 395/122
[58] Field of Search .......................... 395/122, 140, 395/141; 345/113, 114, 118

[56] References Cited

U.S. PATENT DOCUMENTS

| | | | |
|---|---|---|---|
| 4,658,247 | 4/1987 | Gharachorloo | 340/747 |
| 5,220,646 | 6/1993 | Fossum | 395/122 |
| 5,249,264 | 9/1993 | Matsumoto | 395/134 |
| 5,293,467 | 3/1994 | Buchner et al. | 395/122 |
| 5,329,613 | 7/1994 | Brase et al. | 395/122 |

OTHER PUBLICATIONS

Williams, P., "Visibility Ordering Meshed Polyhedra", *ACM Transactions on Graphics*, vol. 11, No. 2, Apr. 1992, pp. 103–126.

*Primary Examiner*—Phu K. Nguyen
*Attorney, Agent, or Firm*—Cooper & Dunham

[57] ABSTRACT

A sorting processor has a polygonal priority order generating circuit. The polygonal priority order generating circuit includes a memory for storing information of centers of plural polygons; a position setting section for transforming a coordinate of each of the polygonal centers from an object coordinate to an absolute coordinate; and a visual field transforming circuit for transforming the transformed coordinate as a position set object obtained by the position setting section with respect to a visual field. The sorting processor further has a sorting circuit for sorting transformed results about the visual field on the basis of Z-axis information. There is no frame delay due to a need to wait until the polygonal information is completely sorted. Further, it is not necessary to use a RAM for storing information geometrically transformed before a sorter.

4 Claims, 7 Drawing Sheets

Fig. 8

POLYGON NO. = ADDRESS

| Address | Data |
|---|---|
| 0000 | Z-VALUE LOWER 8 BIT DATA |
| ⋮ | ⋮ |
| 1FFF | DITTO |

28

Z-VALUE LOW SIDE MEMORY

SORTING PROCESSOR

BACKGROUND OF THE INVENTION

1. Field of the Invention

The present invention relates to a sorting processor for sorting and processing polygonal information.

2. Description of the Related Art

For example, a Z-sorting method is generally used when a three-dimensional image is processed in three-dimensional graphics, game machines, workstations, word processors, personal computers, etc. In the Z-sorting method, a sorting operation image data is performed in hidden-surface processing by setting a Z-axis in a depth direction of a screen to a reference axis.

When the Z-sorting method is used in the three-dimensional image processing, a polygonal information generating circuit, a sorting circuit and a polygonal display circuit are used as disclosed in e.g., Japanese Patent Application Laying Open (KOKAI) No. 1-103785. These circuits are constructed such that a pseudo three-dimensional image as a two-dimensional image showing a three-dimensional image is synthesized and displayed on a cathode ray tube (CRT) display.

In this case, the polygonal information generating circuit processes three-dimensional image information. The polygonal information generating circuit performs various kinds of converting and transforming operations such as rotation, parallel displacement, perspective projection, etc. with respect to the three-dimensional image information. Thus, the polygonal information generating circuit converts the three-dimensional image information to be displayed to combinational information of two-dimensional polygons. The polygonal information generating circuit calculates X and Y coordinates at an end point as a vertex of each of the polygons as polygonal information.

A display point of each of the polygons in a depth direction thereof is shown by a Z-coordinate of a central point of each of the polygons. The polygonal information generating circuit also calculates this Z-coordinate as polygonal information. Further, in accordance with necessity, the polygonal information generating circuit calculates color information, brightness information, etc. of the polygons as additional data.

The polygonal information generating circuit further geometrically transforms information such as X and Y coordinates at each of end points of these polygons, a Z-coordinate in a central position of each of the polygons, etc. Thereafter, the geometrically transformed information are sorted by a sorter using the Z-sorting method.

In this general Z-sorting method, when a polygonal shape is complicated and the number of polygons is increased, the number of vertexes of the polygons to be geometrically transformed is increased. As a result, there is a case in which an amount of the polygonal information to be geometrically transformed by the polygonal information generating circuit is very increased before these polygonal information are sorted. Therefore, a geometrical transformation processing time of information of one frame in the polygonal information generating circuit is longer than a time (which is called one frame time in the following description) required to process information of one frame in a sorting processing circuit. Accordingly, a so-called frame delay is caused in a certain case. In this frame delay, a portion of the information data is delayed and sorted when the next frame information is processed by the sorting processing circuit.

It is necessary to dispose a buffer RAM to prevent such a frame delay from being caused. In this case, the buffer RAM is disposed to input geometrical transformation results of one frame obtained by a geometrical transforming device to the sorting processing circuit at predetermined timing.

SUMMARY OF THE INVENTION

It is therefore an object of the present invention to provide a sorting processor in which no frame delay is caused until polygonal information is completely sorted, and it is not necessary to dispose a RAM for storing information geometrically transformed before a sorter.

The above object of the present invention can be achieved by a sorting processor comprising a polygonal priority order generating circuit including a memory for storing information of centers of plural polygons; a position setting section for transforming a coordinate of each of the polygonal centers from an object coordinate to an absolute coordinate; and a visual field transforming circuit for transforming the transformed coordinate as a position set object obtained by the position setting section with respect to a visual field; the sorting processor further comprising a sorting circuit for sorting transformed results about the visual field on the basis of information of a reference axis.

The polygonal priority order generating circuit is a geometrical transforming device for geometrically transforming polygonal center information. The polygonal priority order generating circuit transforms only a coordinate of a polygonal center by the position setting section from an object coordinate to an absolute coordinate as a world coordinate. The visual field transforming circuit transforms the transformed coordinate of the polygonal center with respect to a visual field set by X, Y and Z axes. The visual field transforming circuit transfers the transformed results to the sorting circuit.

Accordingly, the number of information geometrically transformed by the polygonal priority order generating circuit is equal to the number of polygons. Therefore, a time required for processing of the geometrical transformation prior to the sorting circuit can be reduced to a time within one frame time.

Processed results of the polygonal priority order generating circuit are inputted to the sorting circuit. The sorting circuit then sorts these processed results by using a distribution counting method in which an application bin sort is used as an algorithm. Namely, a polygon number is written to the distribution counting memory of a work memory in accordance with a Z-value transformed by the polygonal priority order generating circuit with respect to the visual field. When there are a plurality of polygon numbers at the same Z-value, the plural polygon numbers are chained and written to the chain memory. After processing of the polygonal priority order generating circuit and this writing operation of the chain memory are completely performed, the polygon numbers are read out of the distribution counting memory in a small address order, i.e., in a small order of the Z-value and are transferred to a polygonal display circuit. When there are a plurality of polygon numbers at the same Z-value, the plural polygon numbers are read out of the chain memory and are transferred to the polygonal display circuit.

Further objects and advantages of the present invention will be apparent from the following description of the

BRIEF DESCRIPTION OF THE DRAWINGS

FIG. 8 is a view showing a stored pattern of a Z-value low side memory in each of the above two embodiments of the present invention.

DESCRIPTION OF THE PREFERRED EMBODIMENTS

The preferred embodiments of a sorting processor in the present invention will next be described in detail with reference to the accompanying drawings.

A sorting processor in accordance with a first embodiment of the present invention will first be concretely described with reference to FIGS. 1 to 5.

Figure 1:
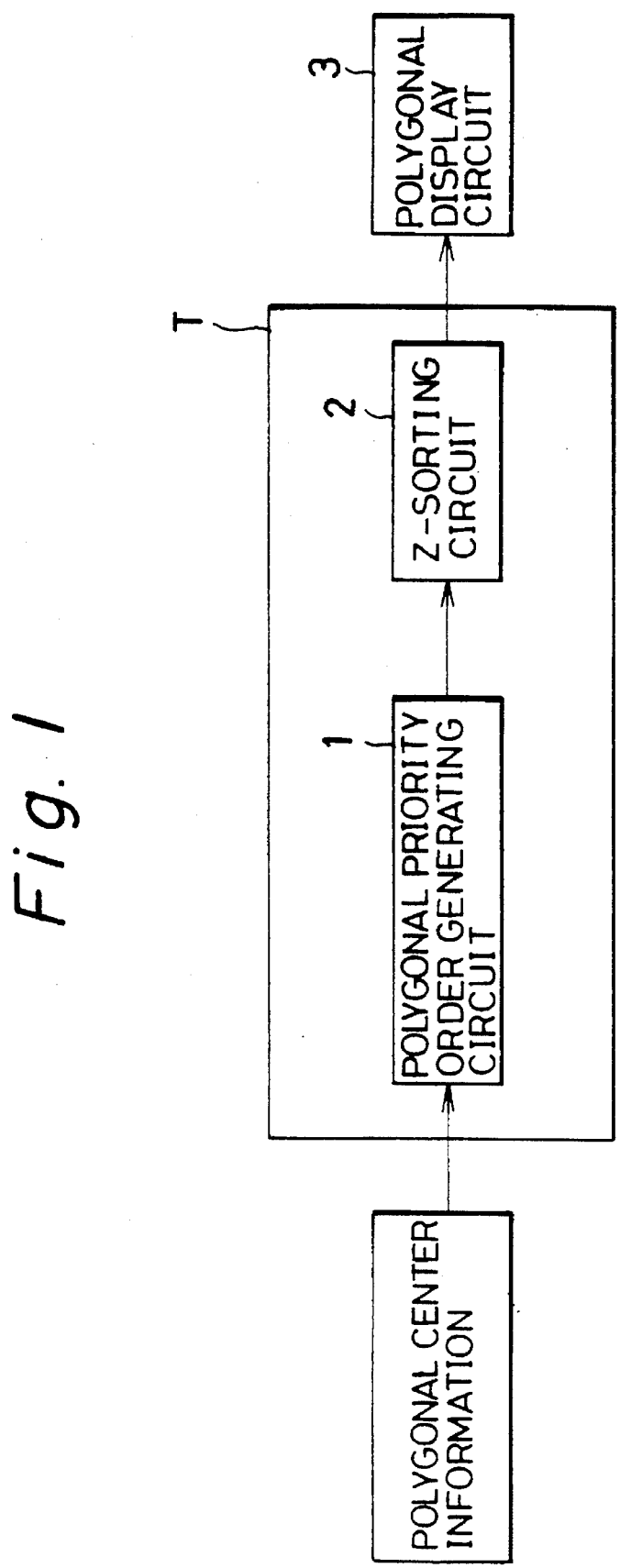
FIG. 1 is a circuit block diagram of a sorting processor in accordance with one embodiment of the present invention.

As shown by a block diagram of FIG. 1, this sorting processor has a polygonal priority order generating circuit 1 and a Z-sorting circuit 2 integrated within one semiconductor chip T. The polygonal priority order generating circuit 1 generates a priority order of a polygon. For example, the polygonal priority order generating circuit 1 receives information about the center of a polygon provided from a polygonal information recording medium disposed outside this polygonal priority order generating circuit 1. The polygonal priority order generating circuit 1 geometrically transforms a central position of this polygon. The Z-sorting circuit 2 performs a sorting operation based on the above processed results of the geometrical transformation by a distribution counting method (or an application bin sorting method) with a Z-axis as a reference axis. The Z-sorting circuit 2 outputs sorted information about the central position of the polygon to a polygonal display circuit 3.

Figure 2:
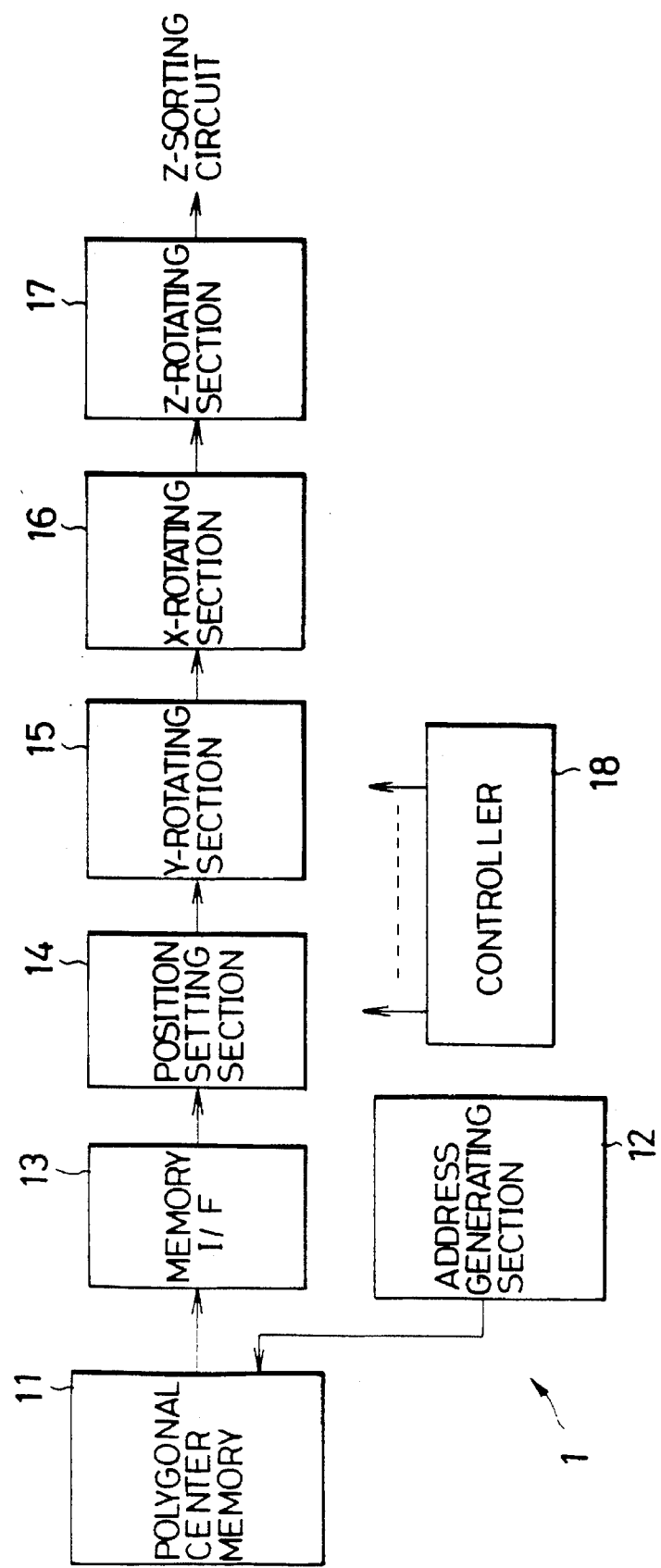
FIG. 2 is a block diagram of a polygonal priority order generating circuit in the present invention.

As shown by a circuit block diagram of FIG. 2, the polygonal priority order generating circuit 1 has a polygonal center memory 11 for storing provided information about the polygonal center, an address generating section 12, a memory interface (I/F) 13, a position setting section 14, a Y-rotating section 15, an X-rotating section 16, a Z-rotating section 17 and a controller 18 for controlling operations of these sections. The polygonal center memory 11, the memory interface (I/F) 13, the position setting section 14, the Y-rotating section 15, the X-rotating section 16 and the Z-rotating section 17 are connected in series to each other. The address generating section 12 is connected to the polygonal center memory 11.

The polygonal center memory 11 stores information of single or plural polygonal centers inputted to this polygonal center memory 11 from its exterior in a state in which an address generated by the address generating section 12 is added to this polygonal center information. The memory interface (I/F) 13 sequentially reads the above stored polygonal center information from the polygonal center memory 11. The position setting section 14 transforms a coordinate of the polygonal center from an object coordinate to an absolute coordinate as a world coordinate. Thereafter, the Y-rotating section 15, the X-rotating section 16 and the Z-rotating section 17 perform a required geometrical transformation as a visual field transformation for rotating the transformed polygonal center information around Y, X and Z axes, respectively. The Y-rotating section 15, the X-rotating section 16 and the Z-rotating section 17 then outputs the polygonal center information transformed with respect to the visual field to the Z-sorting circuit 2.

In this first embodiment, for brevity, the polygonal center information is simply rotated in the visual field transformation, but may be processed by various kinds of transformations such as parallel displacement, perspective projection, etc.

Figure 3:
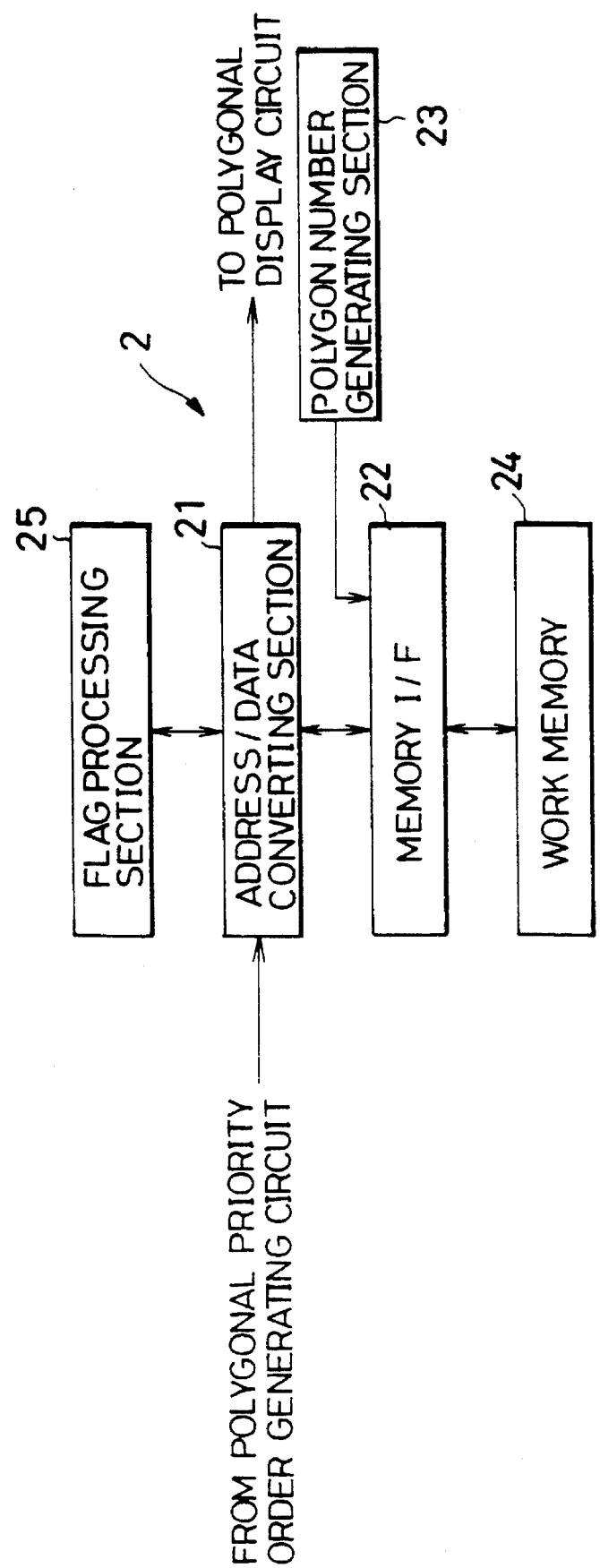
FIG. 3 is a block diagram of a Z-sorting circuit in the present invention.
Figure 4:
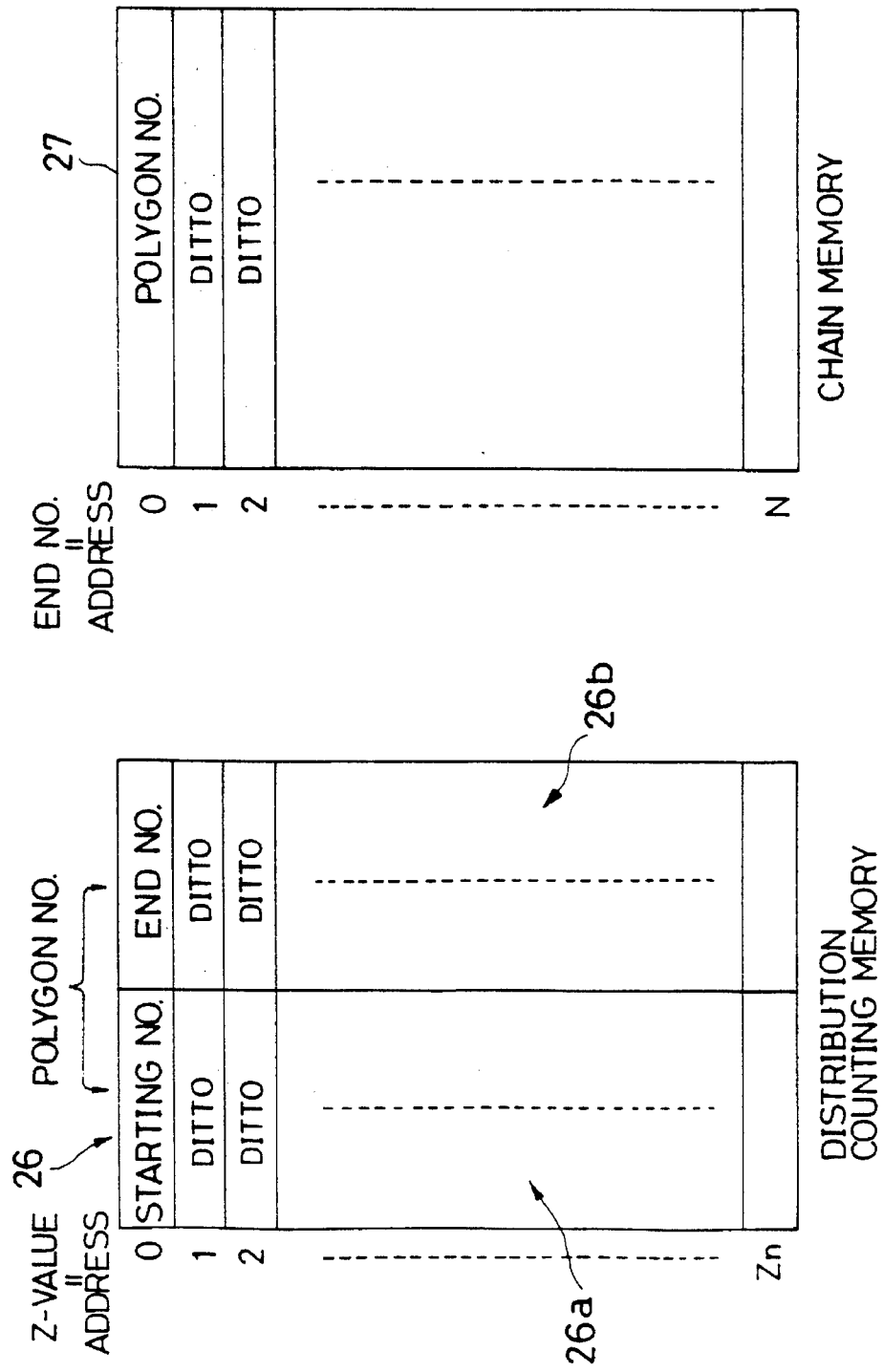
FIGS. 4a and 4b are views showing stored patterns of a work memory in the Z-sorting circuit in the present invention.
Figure 5:
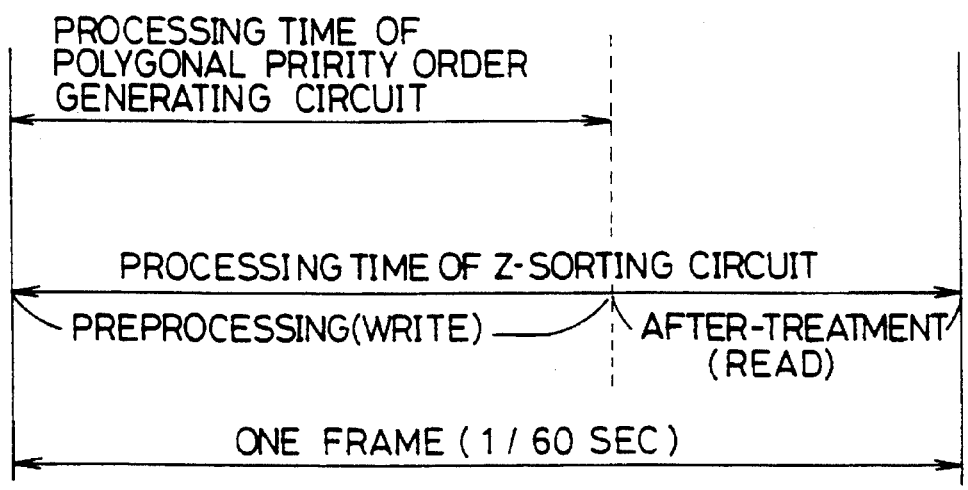
FIG. 5 is a timing chart showing an operation of the sorting processor in the present invention.

As shown by a block diagram of FIG. 3, the above Z-sorting circuit 2 has an address/data converting section 21, a memory interface (I/F) 22, a polygon number (No) generating section 23, a work memory 24 and a flag processing section 25. The address/data converting section 21 receives the polygonal center information outputted from the polygonal priority order generating circuit 1 and transformed with respect to the visual field. For example, the address/data converting section 21 converts a Z-value as data of the polygonal center information to each of addresses 0 to $Z_n$. The memory interface (I/F) 22 outputs the above converted address and a polygon number generated by the polygon number generating section 23 to the work memory 24 in one-to-one correspondence.

As shown by memory patterns in FIGS. 4a and 4b, the work memory 24 has a distribution counting memory shown in FIG. 4a and a chain memory 27 shown in FIG. 4b. The distribution counting memory 26 has a starting number (No) area 26a and an end number (No) area 26b.

Data inputted from the memory interface (I/F) 22 to the distribution counting memory 26 are sequentially stored to memory regions of the starting number area 26a and the end number area 26b corresponding to added addresses.

Each of the addresses of the distribution counting memory 26 shows a Z-value of central information of each of polygons. Accordingly, there is a case in which plural polygon numbers as plural data are inputted to the same address of the distribution counting memory 26. In this case, the sorting processor is set such that first written data are held in the starting number area 26a. In contrast to this, stored data in the end number area 26b are rewritten to newly inputted data.

The chain memory 27 has a memory area having an address corresponding to each of the polygon numbers. When data in the end number area 26b are updated, a polygon number as the updated data in the end number area 26b is written to this memory area of the chain memory 27 in a state in which data in the end number area 26b prior to this update are set to an address.

When all polygon numbers are completely written to the distribution counting memory 26 or the chain memory 27, inputted data in the starting number area 26a at an address of the distribution counting memory 26 next to an address providing different data in the starting number area 26a and the end number area 26b are written to the chain memory 27 with the data in the end number area 26b as an address.

Thus, a data number is stored to the starting number area 26a of the distribution counting memory 26 and the chain memory 27 in a state in which the starting number area 26a and the chain memory 27 are chained together. Thereafter, a polygon number as the data number is read out of the starting number area 26a through the memory interface I/F 22 in a small address order, i.e., in a small order of Z-values. The read polygon number is then outputted to the polygonal display circuit 3. When there are plural polygon numbers at the same address, polygon numbers are read from the starting number area 26a and polygon numbers written to the chain memory 27 are then read from this chain memory 27 in a writing order of these polygon numbers. Thereafter, next data stored at subsequent addresses in the starting number area 26a are read out of the starting number area 26a and are output ted to the polygonal display circuit 3.

The flag processing section 25 is disposed to restrain useless processings from being minimized when the Z-values are read in a small order. For example, the useless processings are constructed by reading of data at addresses at which no data are inputted.

Similar to the geometrical transformation processing of the polygonal central position information, the other data with respect to the polygonal information can be completely processed by geometrically transforming these data in parallel with sorting processing of the polygonal central position information while a sorting operation is performed with respect to these data. The other data information geometrically transformed can be inputted to the polygonal display circuit 3 and can be outputted and displayed by the polygonal display circuit 3 in a state in which the other data information corresponds to the polygonal central position information.

Thus, it is possible to reduce a data amount of the geometrical transformation prior to the sorting processing by geometrically transforming only the polygonal central position information. For example, as shown by a timing chart of FIG. 5, a processing time of the geometrical transformation can be sufficiently reduced to a time within one frame time. Accordingly, it is possible to prevent a frame delay from being caused without disposing any buffer RAM before the Z-sorting circuit 2.

The polygonal priority order generating circuit 1 and the Z-sorting circuit 2 are integrated in one semiconductor chip T. Accordingly, it is possible to delete or reduce pin holes, foot prints, conductive patterns, etc. in a printed board for arranging the polygonal priority order generating circuit 1 and the Z-sorting circuit 2. Accordingly, manufacturing cost of the printed board can be reduced. Further, it is possible to prevent noises from being caused by connecting the polygonal priority order generating circuit 1 to the Z-sorting circuit 2. Accordingly, a processing speed of the sorting processor can be further increased by using a high speed clock signal.

Figure 6:
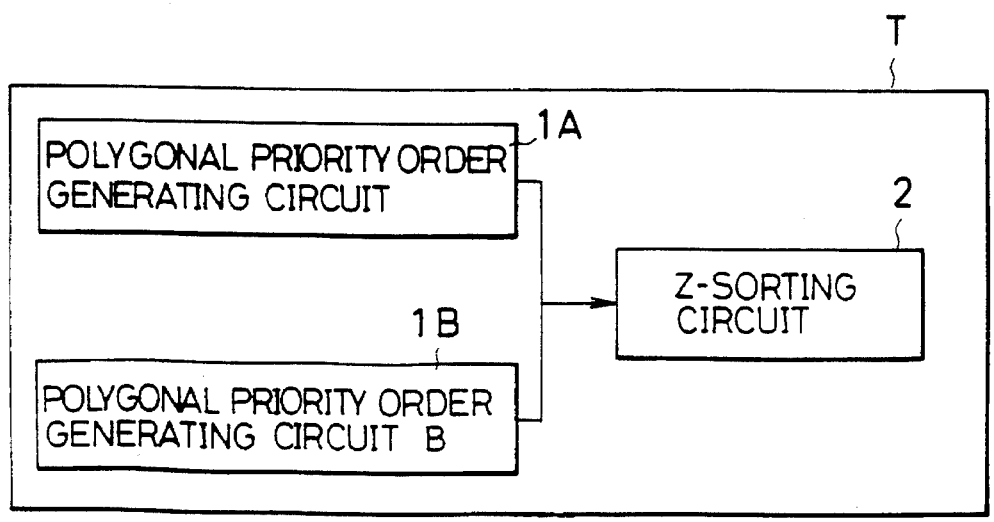
FIG. 6 is a circuit block diagram of a sorting processor in accordance with another embodiment of the present invention.
Figure 7B:
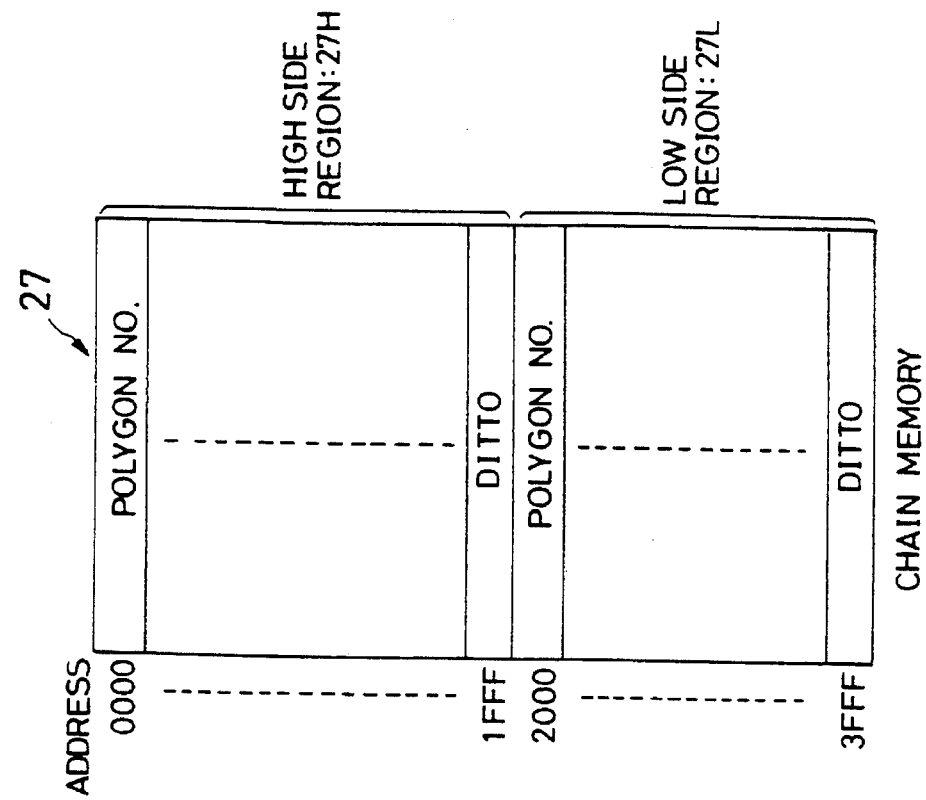
FIGS. 7a and 7b are views showing stored patterns of a distribution counting memory and a chain memory in each of the above two embodiments of the present invention.
Figure 7A:
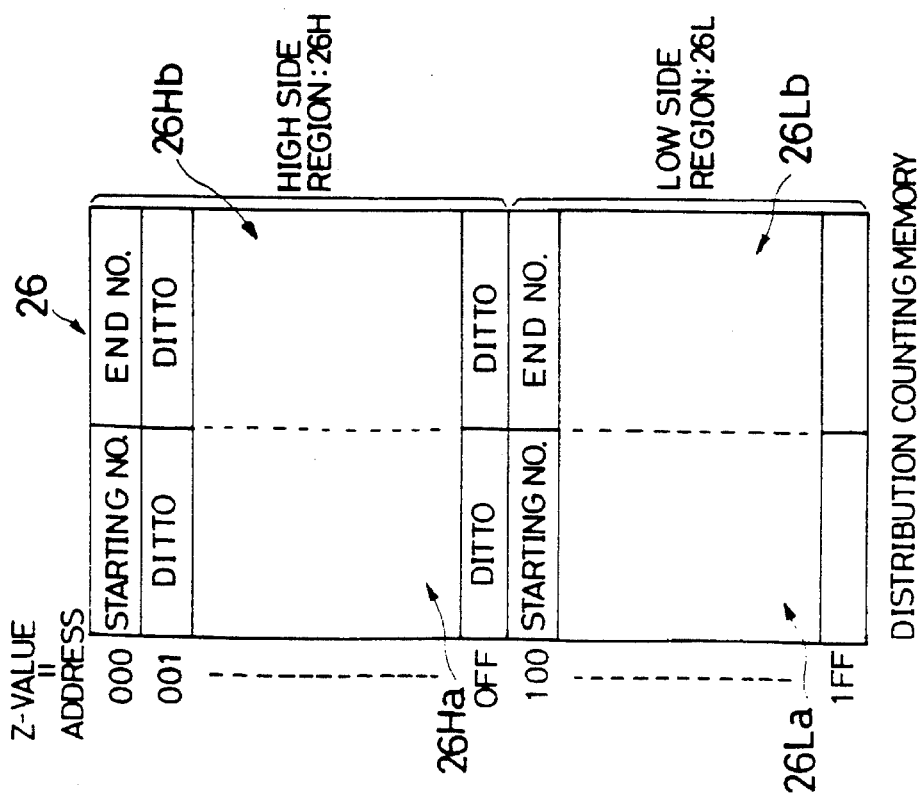

FIG. 6 shows a sorting processor in accordance with a second embodiment of the present invention. In this embodiment, two polygonal priority order generating circuits 1A, 1B and one Z-sorting circuit 2 arc integrated in one semiconductor chip. In this case, the two polygonal priority order generating circuit 1A and 1B are operated in parallel with each other. Data results transformed by the polygonal priority order generating circuits 1A and 1B with respect to a visual field are alternately inputted to the Z-sorting circuit 2 and are written to a work memory 24. Accordingly, it is possible to reduce a processing time of the polygonal priority order generating circuits 1A and 1B. It is also possible to reduce a preprocessing time for writing data to the Z-sorting circuit 2 and equal to the processing time of the polygonal priority order generating circuits 1A and 1B. For example, central position information of many polygons such as about 15,000 polygons can be sorted within one frame time.

When the number of polygons is equal to about 6,000, a width of Z-values is widened from 0 to about 215 so that the size of a memory region is considerably increased. Therefore, at a technical level of the sorting processor at present, it is difficult to integrate one polygonal priority order generating circuit 1 and the Z-sorting circuit 2 in one semiconductor chip.

To solve this problem, the sorting processor in each of the first and second embodiments of the present invention has a high side region 26H and a low side region 26L as shown in FIG. 8. The high side region 26H is disposed in the distribution counting memory 26 of the work memory 24 of the Z-sorting circuit 2 and has addresses numbered from 0 to 0FF. The low side region 26L is disposed in the distribution counting memory 26 of the work memory 24 of the Z-sorting circuit 2 and has addresses numbered from 100 to 1FF. The chain memory 27 has a high side region 27H having addresses numbered from 0000 to 1FFF and has a low side region 27L having addresses numbered from 2000 to 3FFF. Further, as shown in FIG. 8, the work memory 24 has a Z-value low side memory 28 for setting a polygon number to an address and storing data of lower 8 bits showing a Z-value.

In this second embodiment, the Z-value is calculated by the polygonal priority order generating circuit 1 and is divided into upper 8 bits and lower 8 bits. The upper 8 bits about the Z-value are converted to addresses from 0 to 100 by an address/data converting section 21. Each of these addresses 0 to 100 are added by a memory I/F 22 to a polygon number generated by the polygon number generating section 23. This polygon number is written to a memory region corresponding to each of addresses in a starting number region 26Ha and an end number region 26Hb of the high side region 26H.

When plural data are input ted to the same address in the high side region 26H, data in the starting number region 26Ha are held as a first inputted polygon number and data in the end number region 26Hb are updated to a polygon number inputted later. In this case, the updated polygon number is written to the high side region 27H of the chain memory 27 in a state in which the polygon number prior to this update is set to an address.

When all polygon numbers are completely written to the high side region 26H of the distribution counting memory 26 or the high side region 27H of the chain memory 27, plural inputted polygon numbers are read out of the starting number region 26Ha and the high side region 27H of the chain memory 27 at respective addresses in the high side region 26H of the distribution counting memory 26 to which the plural polygon numbers are inputted. The lower 8 bits about the Z-value are written to the Z-value low side memory 28 with these polygon numbers as addresses. Each of the polygon numbers is written to the starting number region 26La and the end number region 26Lb in the low side region 25L of the distribution counting memory 25 with the Z-value of the lower 8 bits as an address.

When plural polygon numbers are written to the same address in the low side region 26L, data in the starting number region 26La are held as a first inputted polygon number and data in the end number region 26Lb are updated to a polygon number inputted later. In this case, the updated polygon number is written to the low side region 27L of the chain memory 27 with the polygon number prior to this update as an address. Then, the polygon numbers are read from the distribution counting memory 26 in a small order of addresses in the low side region 26L. Data in the starting number region 26Ha of the low side region 26L of the distribution counting memory 26 are updated to data at a smallest address. Further, the remaining data are chained and stored to the high side region 27H of the chain memory 27. An address providing plural inputted data in the low side region 26L of the distribution counting memory 26 is read therefrom in an input order of data inputted to the low side region 27L of the chain memory 27 in a state in which this address is chained to the plural inputted data at this address. The read address is stored to the high side region 27H of the chain memory 27.

No processing with respect to the lower 8 bits about the Z-value is required when no high side region 26H has an address to which plural data are inputted.

Such processing is completely performed with respect to all addresses in the high side region 26H of the distribution counting memory 26 to which plural polygon numbers are inputted. Thereafter, data in the starting number area 26Ha in the high side region 26H of the distribution counting memory 26 are read therefrom in a small address order and are transferred to the polygonal display circuit 3.

When plural data are inputted to the same address in the starting number area 26Ha in the high side region 26H of the distribution counting memory 26, these plural data at this address and data chained and stored to the high side region 27H of the chain memory 27 are sequentially read from the starting number area 26Ha and the high side region 27H, respectively. Thereafter, inputted data at an address next to the address providing the plural inputted data are read from the starting number area 26Ha and the high side region 27H and are transferred to the polygonal display circuit 3.

In this sorting processor, when a clock signal for controlling timing of the sorting processing has a frequency of 4 MHz (a period of 70 ns), the sorting processing can be sufficiently performed by setting a processing time of the polygonal priority order generating circuit 1 to 1/90 sec showing 2/3 frame. A sorting operation of the sorting circuit 2 can be performed in parallel with processing of the polygonal priority order generating circuit 1. When the flag processing section 25 is constructed by using a register file of 8 bits×32 words, the sorting operation can be performed by using (N+8709) clock signals when an initializing time of the work memory 24 is included and N is set to the total number of polygons. When the total number N of polygons is equal to 6000, a processing time of the sorting circuit 2 is equal to about 2.3 ms showing about 1/6 frame time since 1/3 frame time is approximately equal to 5.5 ms.

As mentioned above, in accordance with the present invention, a Z-sorting operation is performed with respect to only information of a polygonal center. Accordingly, an amount of processed data is reduced before the sorting operation. Therefore, a processing time of the processed data can be reduced and it is possible to reliably prevent a frame delay from being caused.

Further, in the present invention, when the polygonal priority order generating circuit and the sorting circuit are integrated in one semiconductor chip, it is possible to delete or reduce pin holes, foot prints and conductive patterns in a printed wiring board for arranging the polygonal priority order generating circuit and the sorting circuit so that cost of the sorting processor can be reduced. It is also possible to prevent noises from being caused by connection of the polygonal priority order generating circuit and the sorting circuit. Further, sorting processing of the sorting processor can be performed at a high speed by using a high speed clock signal.

In the present invention, the above sorting circuit has an address/data converting circuit for converting data of the polygonal center information to an address; an address number generating section for generating an input order of the polygonal center information; a distribution counting memory for writing the input order of the polygonal center information by adding an address converted from the polygonal center information data to this input order; and a chain memory for chaining and writing data at the same address converted from the polygonal center information data. The distribution counting memory includes a high side region for setting upper 8 bits at the converted address to an address, and includes a low side region for setting lower 8 bits at the same converted address as the upper 8 bits to an address. Data in the high side region are read therefrom in a small address order when these data are read out of the distribution counting memory. Data in the low side region are read therefrom in a small order of addresses in the low side region only when there are plural data at the same address in the high side region. Data of the chain memory are read therefrom only when there are plural data at the same address in the low side region. In accordance with this structure of the sorting processor, the polygonal priority order generating circuit and the sorting circuit can be easily integrated in one semiconductor chip. Further, a processing time of the sorting processor can be greatly reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sorting processor comprising:
   a polygonal priority order generating circuit including:
   a memory for storing information of centers of plural polygons;
   a position setting section for transforming a coordinate of each of the polygonal centers from an object coordinate to an absolute coordinate; and
   a visual field transforming circuit for transforming the transformed coordinate as a position set object obtained by the position setting section with respect to a visual field; and
   a sorting circuit for sorting transformed results about the visual filed on the basis of information of a reference axis.

2. A sorting processor as in claim 1, wherein the polygonal priority order generating circuit and the sorting circuit are integrated in one semiconductor chip.

3. A sorting processor as in claim 2, wherein said sorting circuit has:
   an address/data converting circuit for converting data of the polygonal center information to an address;
   an address number generating section for generating an input order of the polygonal center information;
   a distribution counting memory for writing the input order of the polygonal center information by adding an address converted from the polygonal center information data to said input order; and a chain memory for chaining and writing data at the same address converted from the polygonal center information data;

said distribution counting memory including;

a high side region for setting upper 8 bits at the converted address to an address; and a low side region for setting lower 8 bits at the same converted address as the upper 8 bits to an address;

the sorting processor being constructed such that data in the high side region are read therefrom in a small address order when said data are read out of the distribution counting memory;

data in the low side region are read therefrom in a small order of addresses in the low side region only when there are plural data at the same address in the high side region; and data of the chain memory are read therefrom only when there are plural data at the same address in the low side region.

4. A sorting processor as in claim 1, wherein said sorting circuit has:

an address/data converting circuit for converting data of the polygonal center information to an address;

an address number generating section for generating an input order of the polygonal center information;

a distribution counting memory for writing the input order of the polygonal center information by adding an address converted from the polygonal center information data to said input order; and a chain memory for chaining and writing data at the same address converted from the polygonal center information data;

said distribution counting memory including;

a high side region for setting upper 8 bits at the converted address to an address; and a low side region for setting lower 8 bits at the same converted address as the upper 8 bits to an address;

the sorting processor being constructed such that data in the high side region are read therefrom in a small address order when said data are read out of the distribution counting memory;

data in the low side region are read therefrom in a small order of addresses in the low side region only when there are plural data at the same address in the high side region; and data of the chain memory are read therefrom only when there are plural data at the same address in the low side region.

\* \* \* \* \*